United States Patent Office 2,816,034
Patented Dec. 10, 1957

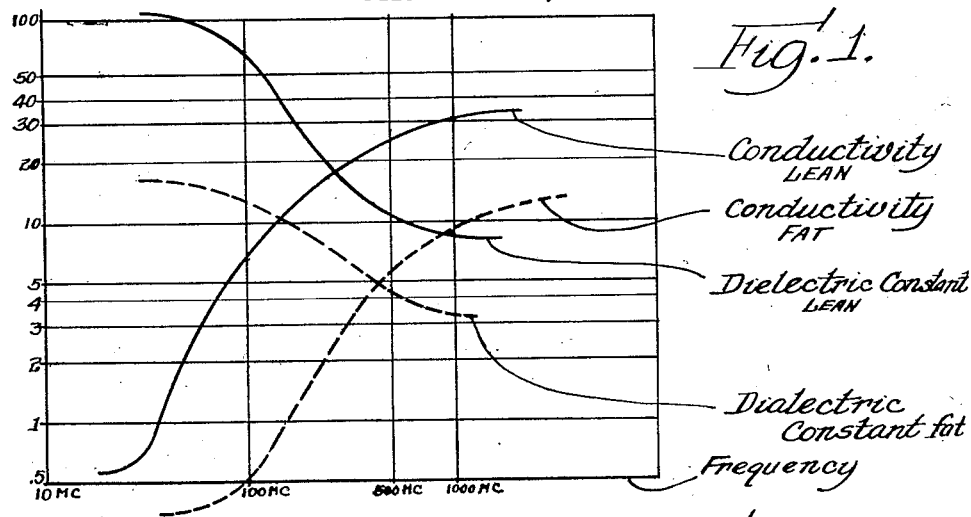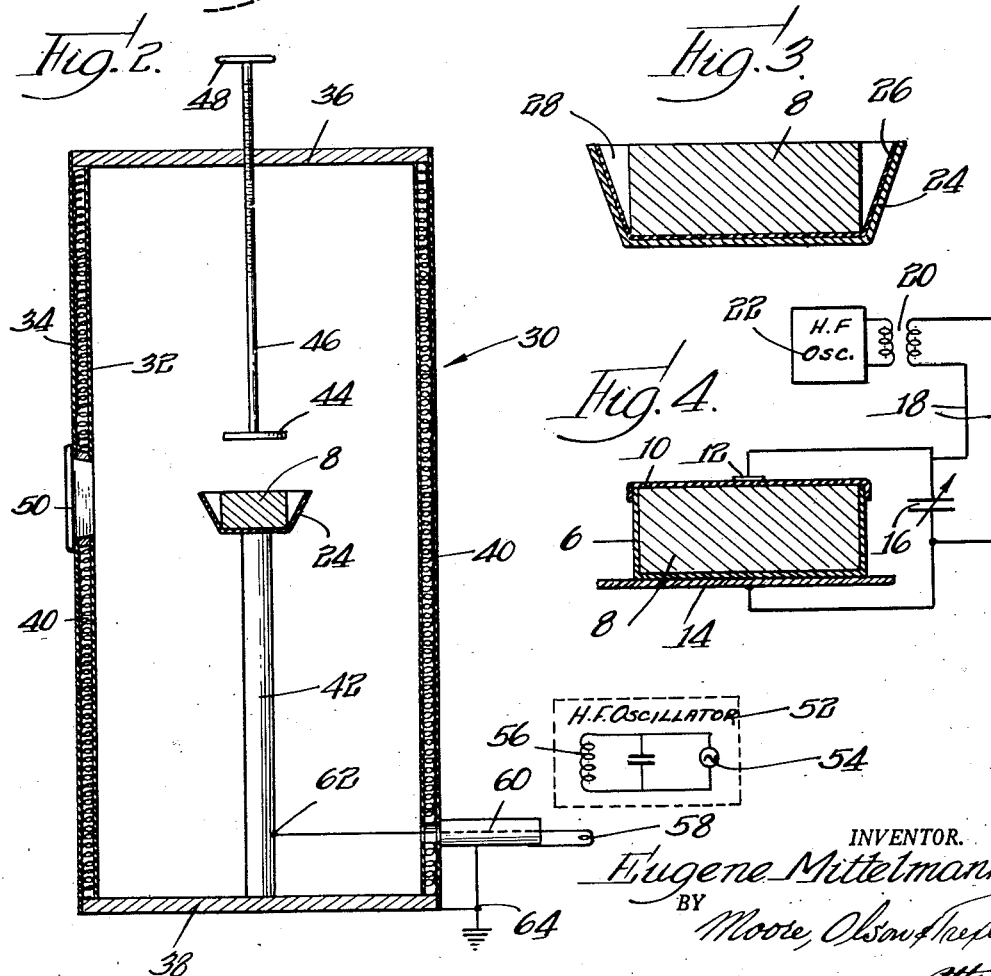

2,816,034

HIGH FREQUENCY PROCESSING OF MEAT AND APPARATUS THEREFOR

Eugene Mittelmann, Chicago, Ill., assignor to Wilson & Co., Inc., Chicago, Ill., a corporation of Delaware Application March 10, 1951, Serial No. 214,960

10 Claims. (Cl. 99—107)

This invention is concerned with the processing of meat by high frequency electrical energy.

Canned meat and meat products often are cooked before the completion of the canning process. Heretofore this cooking generally has been carried out by the application of heat to the exterior of the meat or packages in which the meat has been contained. Application of heat from the outside causes the meat to be cooked much more thoroughly on the outside than on the inside. An object of this invention is the provision of a method and apparatus for the high frequency processing of meat to obtain uniform cooking of the meat.

Another object of this invention is the provision of a method and apparatus for the high frequency processing of meat in the containers or packages in which the meat ultimately will be sold.

Cooked meat products heretofore generally have been cooked completely during the canning process. It has been necessary to heat the meat again immediately prior to serving in order to render it palatable. It is evident that the initial cooking and later heating are duplicated in part.

A further object of this invention is the provision of a container wherein meat products in the container can be heated by high frequency currents immediately prior to cooking to raise the meat products to a palatable temperature and to complete necessary cooking of the meat products.

A specific object of this invention resides in the provision of a method and apparatus for the high frequency processing of meat contained in glass jars.

Another specific object of this invention resides in the provision of a method and apparatus for the high frequency processing of meat contained in metal cans.

Meat products generally consist of lean meat sections interspersed with fatty layers. The dielectric constant of fat in the range of practical operating frequencies is higher than that of lean meat and conversely the conductivity of lean meat is higher than that of fat. If meat is placed in a dielectric field with the meat layers perpendicular to the electrodes between which the field is established (i. e., substantially parallel to the dielectric field), the layer with the higher conductivity will be heated at a more rapid rate. The lean meat thus will be relatively overcooked and the fat will be relatively undercooked.

If lean meat and fat are arranged in layers substantially perpendicular to the high frequency field (i. e., parallel to the electrodes between which the field is established), both lean meat and fat must carry the same current and the material of higher resistance, namely, the fat, will be heated much more rapidly than the other. Direct heat transfer between the layers tends to equalize the over-all temperature, but relative overcooking and undercooking of the fat and lean meat will result prior to equalization.

Conductivity and dielectric constants of a material change with the frequency of a dielectric field established across it and change at somewhat different rates for different materials. Unfortunately it is not possible mathematically to determine for any arbitrary material with unknown "fat and lean" distribution a frequency at which that particular material will show the greatest amount of power absorption.

An important object of this invention is the selection of a proper operating frequency of a dielectric heater for substantially equal heating of fat and lean meat.

Lead wires between the generator and electrodes of any high frequency system establishing a dielectric field tend to distort this field, and I have found that when meat in a can is subjected to a high frequency field between conventional electrodes the lead wires distort the field sufficiently to cause uneven cooking.

An object of this invention resides in the provision of a cavity resonator for the high frequency processing of meat with an absolutely uniform field.

Yet another object of this invention resides in the provision of a metal can of novel construction for effecting uniform heating of a meat product contained therein.

Other objects and advantages of the present invention will be apparent from a perusal of the following description when taken in conjunction with the accompanying drawings illustrating apparatus capable of effecting the high frequency processing of meat in accordance with the principles of my invention.

In the drawings:

Fig. 1 is a diagram showing certain electrical properties of fat and lean meat;

Fig. 2 is a somewhat schematic side view of a cavity resonator for the high frequency processing of meat.

Fig. 3 is a sectional view showing the details of a can and meat therein; and

Fig. 4 illustrates the high frequency processing of meat in a glass jar.

Referring first to Fig. 1, it will be seen that the conductivity of lean meat and fat is relatively rather low at lower frequencies and heating at these frequencies therefore would be slow. At extreme high frequencies, on the order of 900 megacycles and above, reflection takes place at the boundaries between layers of lean meat and fat which leads to an undesirable high temperature zone below the surface of the uppermost layer. Inspection of the curves reveals that in the range from about 100 to 200 megacycles the differences between the electrical properties of fat and lean meat are relatively smaller than either above or below these values while the conductivities are sufficiently high to insure rapid heating. I have found, as a result of numerous experiments, that an operating frequency of 160 megacycles results in rapid heating without an impractically high temperature gradient between the lean meat and fat.

The high frequency processing of meat in glass jars is relatively simple due to the dielectric properties of glass, and I have shown a satisfactory arrangement for such processing in Fig. 4. A glass jar 6 is shown filled with a meat product 8 and closed at the top by a metal cap 10 which may be clamped or screwed, or otherwise suitably secured to the top of the jar. The meat product in this and other containers is arranged in layers of lean meat and fat substantially perpendicular to the axis of the container. The cap 10 is used as an electrode and electrical potential is applied to the cap through a suitable contactor 12 held in contact with the outside of the cap. The jar rests on a metal plate 14 which forms the other electrode. I have found that the relative dimensions of the cap 10 and the plate 14 are not critical, but have shown a satisfactory practical arrangement wherein the plate is slightly larger in diameter than the cap. The electrodes are paralleled by a variable capacitor 16 and this parallel combination is connected by a lead line 18, preferably of a ¼ or ¾ wave length, to the secondary of a transformer 20. The primary of the transformer is supplied by any high frequency oscillator 22 in a known manner. Using this arrangement and with the fat and lean meat arranged in layers substantially perpendicular to the dielectric field established between the electrodes, I have found that quite uniform heating results in a very short time.

Much canned meat is sold in metal cans, and it is desirable to process the meat while in the cans. Obviously it would be impossible to heat meat in a metal can to which the lid has been attached as the can would form a practically perfect shield and would keep the high frequency energy from the meat. Many difficulties have been encountered in attempting to heat meat in a metal can having one end left open. The can necessarily acts as one electrode and with a second electrode spaced from the open end of the can, I have found uneven heating with most of the arrangements tried. With a common cylindrical can, the meat was found to be heated only near the top with the meat along the central axis of the can being heated to a greater depth than along the edges. The addition of an insulating material on the inside of the can was found to increase the depth of heating, but the meat was not heated entirely to the bottom of the can and again was heated to a greater depth along the axis than along the edges. It was found that a frusto-conical can reduced the heating along the axis relative to that along the edges and that the addition of insulating material to the inside of the can increased the depth of heating. Additionally, it was found that the field distortion due to lead lines caused uneven heating. It was found possible to eliminate this latter source of uneven heating by use of a cavity resonator as shown in Fig. 2. With the use of such a cavity resonator, it was found to be possible to obtain nearly uniform heating through the meat in a frusto-conical can having insulation on the interior thereof and completely uniform heating was obtained with the arrangement shown in Fig. 3.

Referring to Fig. 3, the meat 8 may be seen to be shaped substantially cylindrically and to be placed within a frusto-conical metallic can 24. The interior of the can is lined with an insulating layer of polythene 26 and an air space 28 is left about the meat in the can. I have found that when the ratio of top to bottom diameter of the can is increased beyond a certain limit, only a shallow ring of meat is heated close to the top of the can. As a specific example, I have found that with a 2" bottom diameter and 2" side walls the top diameter must not be increased beyond 3". It is to be understood that my invention is not limited to cans of this size, and I have heated meat in considerably larger cans. The particular dimensions are given only to illustrate a critical ratio.

A resonant cavity 30 which has been found to work satisfactorily with the can illustrated in Fig. 3 is shown in Fig. 2. The cavity includes a cylindrical double wall construction, including walls 32 and 34 and is closed at each end by top and bottom walls 36 and 38 respectively. Conventional resistance heating coils 40 are contained in the space between the concentric walls 32 and 34 to maintain the inner wall 32 at a sufficiently high temperature to prevent loss of heat from the meat being processed to the walls of the cavity. The cavity is substantially a half wave length long and the can 24 rests atop a pedestal 42 substantially midway between the ends of the cavity at which point the electrical field is intensified by reflection from the top wall 36. An electrode 44 is carried on the end of a rod 46 threaded through the top plate 36 and the spacing of this electrode from the can 24 is controlled by rotating a hand wheel 48 on the upper end of the rod 46. A door 50 is provided in the side wall opposite to the position in which the can is placed for insertion and removal of cans. The door preferably is hinged to the wall and is sealed in closed position by any conventional latch.

Energy is supplied to the cavity resonator 30 from a high frequency oscillator indicated schematically at 52. The oscillator includes a preferably push-pull tube generator 54 having a tuned output circuit 56. The output circuit of the oscillator 52 is coupled to an inductance 58 which is in turn connected to a co-axial line 60 exciting the cavity resonator. The inner conductor of the co-axial line 60 is connected to the pedestal 42 at 62 and the outer conductor is connected to the outer shell of the cavity resonator and both the outer conductor and the cavity resonator are grounded as at 64. Such grounding positively precludes the possibility of injury to an operator and further prevents undesirable electrical fields which might interfere with radio reception being established. For simplicity of illustration, I have omitted the conventional insulation for the heating coils 40 and have omitted the conventional lead wires for these coils.

It will be apparent that the objects of this invention have been fulfilled and that various changes can be made in the illustrative embodiment without departing from the spirit and scope of the appended claims.

What I claim is:

1. The process of heating meat which comprises shaping a quantity of meat into substantially cylindrical form, said meat including alternate layers of fat meat and lean meat disposed parallel to the flat ends of said cylindrical form, placing said meat in a frusto-conical can made of conductive material and lined with a dielectric material and having its smallest diameter slightly greater than the diameter of said cylindrical form, introducing the can with the meat therein between a pair of electrodes, and establishing a high frequency electrical field across said meat in a direction substantially perpendicular to said layers of lean and fat meat to heat said meat uniformly throughout.

2. The process of heating meat which comprises shaping a quantity of meat into substantially cylindrical form, said meat including alternate layers of fat meat and lean meat disposed parallel to the flat ends of said cylindrical form, placing said meat in a frusto-conical can made of conductive material and lined with a dielectric material and having its smallest diameter slightly greater than the diameter of said cylindrical form, introducing the can with the meat therein between a pair of electrodes, and establishing a high frequency electrical field having a frequency of from about 100 megacycles to about 200 megacycles across said meat in a direction perpendicular to said layers of fat meat and lean meat to cook said meat uniformly throughout.

3. The process of heating meat which comprises shaping a quantity of meat into substantially cylindrical form, said meat including alternate layers of fat meat and lean meat disposed parallel to the flat ends of said cylindrical form, placing said meat in a frusto-conical can made of conductive material and lined with a dielectric material and having its smallest diameter slightly greater than the diameter of said cylindrical form, introducing the can with the meat therein between a pair of electrodes, and establishing a high frequency electrical field having a frequency of about 160 megacycles across said meat in a direction substantially perpendicular to said layers of lean meat and fat meat to heat said meat uniformly throughout.

4. Apparatus for the high frequency processing of meat comprising a cavity resonator, a source of high frequency electrical power, means for coupling said source to said cavity resonator, an axial pedestal in said resonator extending from one end of said resonator and terminated at a distance from the other end substantially equal to one-fourth the electrical wave length of said source, an electrode spaced from the termination of said pedestal and supported from the opposite end of the resonator, means for adjusting the spacing between the electrode and the termination of said pedestal, and means for introducing meat into said cavity resonator and positioning it at the termination of said pedestal.

5. The combination for the high frequency processing of meat which comprises a cavity resonator, a conductive pedestal upstanding within said resonator from one end thereof, the upper free end of said pedestal being adapted to support a can containing meat to be processed, an electrode spaced from said pedestal and supported from the other end of said resonator, means for adjusting the spacing between said pedestal and said electrode, a frusto-conical can adapted to contain meat to be processed, means for introducing said can into said resonator at the free end of said pedestal, a source of high frequency electrical power, and means for coupling said source to said cavity resonator to heat meat in said frusto-conical can.

6. An apparatus for the high frequency processing of meat comprising a cavity resonator, a source of high frequency electrical power, an axial pedestal in said resonator extending from one end of said resonator and terminated at a distance substantially equal to one-fourth of the electrical wave length of said source and terminated at a distance from the other end substantially equal to one-fourth of the electrical wave length of said source, said pedestal being formed of a material conductive at the frequency of said source of electrical power, means for coupling said source to said conductive pedestal, an electrode spaced from the termination of said pedestal and supported from the opposite end of the resonator, means for adjusting the spacing between the electrode and the termination of said pedestal, and means for introducing meat into said cavity resonator and positioning it at the termination of said pedestal.

7. An apparatus as set forth in claim 6 for treating meat products including alternate layers of lean and fat meat, in which the frequency of the source of high frequency electrical power is from about 100 megacycles to about 200 megacycles.

8. The combination for the high frequency processing of meat which comprises a cavity resonator, a conductive pedestal upstanding within said resonator from one end thereof, the upper free end of said pedestal being adapted to support a can containing meat to be processed, an electrode spaced from said pedestal and supported from the other end of said resonator, means for adjusting the spacing between said pedestal and said electrode, a frusto-conical can adapted to contain meat to be processed, means for introducing said can into said resonator at the free end of said pedestal, and means for coupling a source of high frequency electrical power to said cavity resonator to heat meat in said frusto-conical can.

9. A combination for the high frequency processing of meat which comprises a cavity resonator, a support within said resonator extending from one end thereof, an electrode spaced from said support and supported from the other end of said resonator, means for adjusting the spacing between said support and said electrode, a frusto-conical can made of conductive material and lined internally with a dielectric material and positioned upon said support and adapted to contain a cylindrically shaped quantity of meat including alternate layers of fat meat and lean meat disposed parallel to the bottom of said can and having a diameter less than the smaller diameter of said can, a source of high frequency electrical power, and means for coupling said source to said cavity resonator to heat the meat in said can on said support uniformly throughout.

10. An apparatus for the high frequency processing of meat comprising a cavity resonator, a source of high frequency electrical power, an axial pedestal in said resonator extending from one end of said resonator and terminated at a distance substantially equal to one-fourth of the electrical wave length of said source and terminated at a distance from the other end of said resonator substantially equal to one-fourth of the electrical wave length of said source, said pedestal being formed of a material conductive at the frequency of said source of electrical power, means for coupling said source to said conductive pedestal, a frusto-conical can on said pedestal and made of conductive material and lined internally with a dielectric material at the frequency of said source of electrical power, said can being adapted to contain a cylindrical shaped quantity of meat having a diameter slightly less than the smaller internal diameter of said can and including alternate layers of lean meat and fat meat disposed parallel to the plane of the bottom of said can, an electrode spaced from said can and meat supported thereon and supported from the opposite end of said resonator, and means for adjusting the spacing between the electrode and said can.

References Cited in the file of this patent

UNITED STATES PATENTS

| | | |
|---|---|---|
| 1,900,573 | McArthur | Mar. 7, 1933 |
| 1,961,681 | Bohart | June 5, 1934 |
| 2,179,676 | Vogt | Nov. 14, 1939 |
| 2,259,318 | Mouromtseff | Oct. 14, 1941 |
| 2,262,020 | Llewellyn | Nov. 11, 1941 |
| 2,266,500 | Lindenblad | Dec. 16, 1941 |
| 2,413,003 | Sherman | Dec. 24, 1946 |
| 2,449,451 | Cassen | Sept. 14, 1948 |
| 2,466,853 | Kinn | Apr. 12, 1949 |
| 2,484,842 | McDonnell | Oct. 18, 1949 |
| 2,488,164 | Bowman | Nov. 15, 1949 |
| 2,488,165 | Bowman et al. | Nov. 15, 1949 |
| 2,494,022 | Weintrob et al. | Jan. 10, 1950 |
| 2,504,109 | Dakin et al. | Apr. 18, 1950 |
| 2,529,717 | Wenger | Nov. 14, 1950 |
| 2,597,825 | Schroeder | May 20, 1952 |
| 2,600,566 | Moffett | June 17, 1952 |
| 2,612,596 | Gross | Sept. 30, 1952 |
| 2,627,571 | Hiekle et al. | Feb. 3, 1953 |
| 2,632,838 | Schroeder | Mar. 24, 1953 |
| 2,632,854 | Altar et al. | Mar. 24, 1953 |

FOREIGN PATENTS

| | | |
|---|---|---|
| 969,699 | France | Dec. 22, 1950 |
| 982,334 | France | June 8, 1951 |

OTHER REFERENCES

"Food Manufacture," May 1950, page 201.